(12) United States Patent
Okazaki et al.

(10) Patent No.: US 12,090,842 B2
(45) Date of Patent: Sep. 17, 2024

(54) ELECTRIC VEHICLE

(71) Applicant: KUBOTA CORPORATION, Osaka (JP)

(72) Inventors: Kazuto Okazaki, Osaka (JP); Shinichi Kawabata, Osaka (JP); Hiroshi Shimada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 230 days.

(21) Appl. No.: 17/742,687

(22) Filed: May 12, 2022

(65) Prior Publication Data

US 2022/0363127 A1 Nov. 17, 2022

(30) Foreign Application Priority Data

May 17, 2021 (JP) ................. 2021-083296

(51) Int. Cl.
*B60K 20/00* (2006.01)
*B60K 1/00* (2006.01)
*B60K 17/12* (2006.01)
*B60K 17/14* (2006.01)

(52) U.S. Cl.
CPC ............. *B60K 20/00* (2013.01); *B60K 1/00* (2013.01); *B60K 17/12* (2013.01); *B60K 17/14* (2013.01)

(58) Field of Classification Search
CPC .......... B60K 20/00; B60K 1/00; B60K 17/12; B60K 17/14; B60L 15/2009; B60L 2240/12; B60L 7/10; B60L 7/24; B60L 17/18; B60L 2200/40; B60L 2240/421; B60L 2240/425; B60L 2240/525
USPC ........................................... 180/293
See application file for complete search history.

(56) References Cited

U.S. PATENT DOCUMENTS

2019/0111789 A1 4/2019 Matsuda et al.
2020/0317060 A1* 10/2020 Dunning ............... B60T 8/3255

FOREIGN PATENT DOCUMENTS

| JP | 58-093403 A | 6/1983 |
|----|-------------|--------|
| JP | 60-046701 A | 3/1985 |
| JP | 2006-101648 A | 4/2006 |
| JP | 2006-117220 A | 5/2006 |

(Continued)

OTHER PUBLICATIONS

Extended European Search Report in connection with the corresponding European Patent Application No. 22173587.1 dated Oct. 26, 2022.

(Continued)

*Primary Examiner* — John D Walters
*Assistant Examiner* — Hilary L Johns
(74) *Attorney, Agent, or Firm* — Greenblum & Bernstein, P.L.C.

(57) ABSTRACT

An electric vehicle includes: an electric motor; a wheel that is driven by the electric motor; a power transmission mechanism that defines at least a part of a power transmission path between the electric motor and the wheel and that transmits rotational power of the electric motor to the wheel; a wheel brake that is provided on the wheel; an electromagnetic brake that stops rotation of the electric motor; and a controller that maintains a control value of a rotation speed of the electric motor at 0 and activates the electromagnetic brake when a vehicle speed becomes lower than or equal to a predetermined value close to 0.

10 Claims, 6 Drawing Sheets

(56) References Cited

FOREIGN PATENT DOCUMENTS

| | | |
|---|---|---|
| JP | 2008-148816 A | 7/2008 |
| JP | 2011-223681 A | 11/2011 |
| JP | 2019-075888 A | 5/2019 |

OTHER PUBLICATIONS

Office Action dated Dec. 19, 2023 in Japanese family member application No. 2021-083296 with English language translation thereof.

\* cited by examiner

ELECTRIC VEHICLE

CROSS REFERENCE TO RELATED APPLICATIONS

This application claims the benefit of priority to Japanese Patent Application No. 2021-083296, filed on May 17, 2021. The entire contents of this application are hereby incorporated herein by reference.

BACKGROUND OF THE INVENTION

1. Field of the Invention

The present invention relates to an electric vehicle that is driven by an electric motor.

2. Description of the Related Art

To date, an electric vehicle disclosed in Japanese Unexamined Patent Application Publication No. 2011-223681 is known as an example of an electric vehicle that is driven by an electric motor. The electric vehicle includes an electric motor, a wheel that is driven by the electric motor, and a brake that can brake the wheel. The brake includes a friction brake.

SUMMARY OF THE INVENTION

In the electric vehicle described above, heat generation and wear of a brake pad due to friction occur when the brake is activated to stop the vehicle in a travelling state. In order to maintain a stopped state, it is necessary to continue depressing a brake pedal or to manually activate a parking brake. In a case where the electric vehicle is a four-wheel drive vehicle that brakes a wheel by pressing a brake disc by using an electric actuator, it is necessary to use two or more electric actuators.

In consideration of these problems, an object of the present invention is to provide an electric vehicle that can reduce heat generation and wear due to friction that occur when a brake is activated, make it easy to maintain a stopped state, and reduce the number of electric actuators for brakes that stop the vehicle.

Technical means used by the present invention to achieve the above object is featured in the following.

An electric vehicle according to an aspect of the present invention includes: an electric motor; a wheel that is driven by the electric motor; a power transmission mechanism that defines at least a part of a power transmission path between the electric motor and the wheel and that transmits rotational power of the electric motor to the wheel; a wheel brake that is provided on the wheel; an electromagnetic brake that stops rotation of the electric motor; and a controller that maintains a control value of a rotation speed of the electric motor at 0 and activates the electromagnetic brake when a vehicle speed becomes lower than or equal to a predetermined value close to 0.

The controller may, after setting the control value to 0 and activating a regenerative brake of the electric motor, maintain the control value at 0 and activate the electromagnetic brake when the vehicle speed becomes lower than or equal to the predetermined value.

The controller may, after activating the wheel brake and the regenerative brake, maintain the control value at 0 and activate the electromagnetic brake when the vehicle speed becomes lower than or equal to the predetermined value.

The controller may, while maintaining the control value at 0, activate the electromagnetic brake when a temperature of the electric motor becomes higher than or equal to a predetermined temperature.

The controller may, while maintaining the control value at 0, activate the electromagnetic brake when a temperature of an electric device electrically connected to the electric motor becomes higher than or equal to a predetermined temperature.

The controller may, while maintaining the control value at 0, activate the electromagnetic brake when a predetermined time elapses.

The electromagnetic brake may be provided on the power transmission path between the electric motor and the wheel.

The electromagnetic brake may be provided on a power transmission path between the electric motor and the power transmission mechanism.

The electric vehicle may include a transmission shaft that transmits the rotational power of the electric motor to a moving unit other than the wheel; a clutch that allows or prohibits transmission of the rotational power may be provided between an output shaft of the electric motor and the transmission shaft; and the controller may, when stopping movement of the moving unit, maintain the control value at 0 and activates the electromagnetic brake and causes the clutch to prohibit transmission of the rotational power.

The electric vehicle may include an operation unit that is operated by an operator, and the controller may stop activation of the electromagnetic brake when the operation unit is operated.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
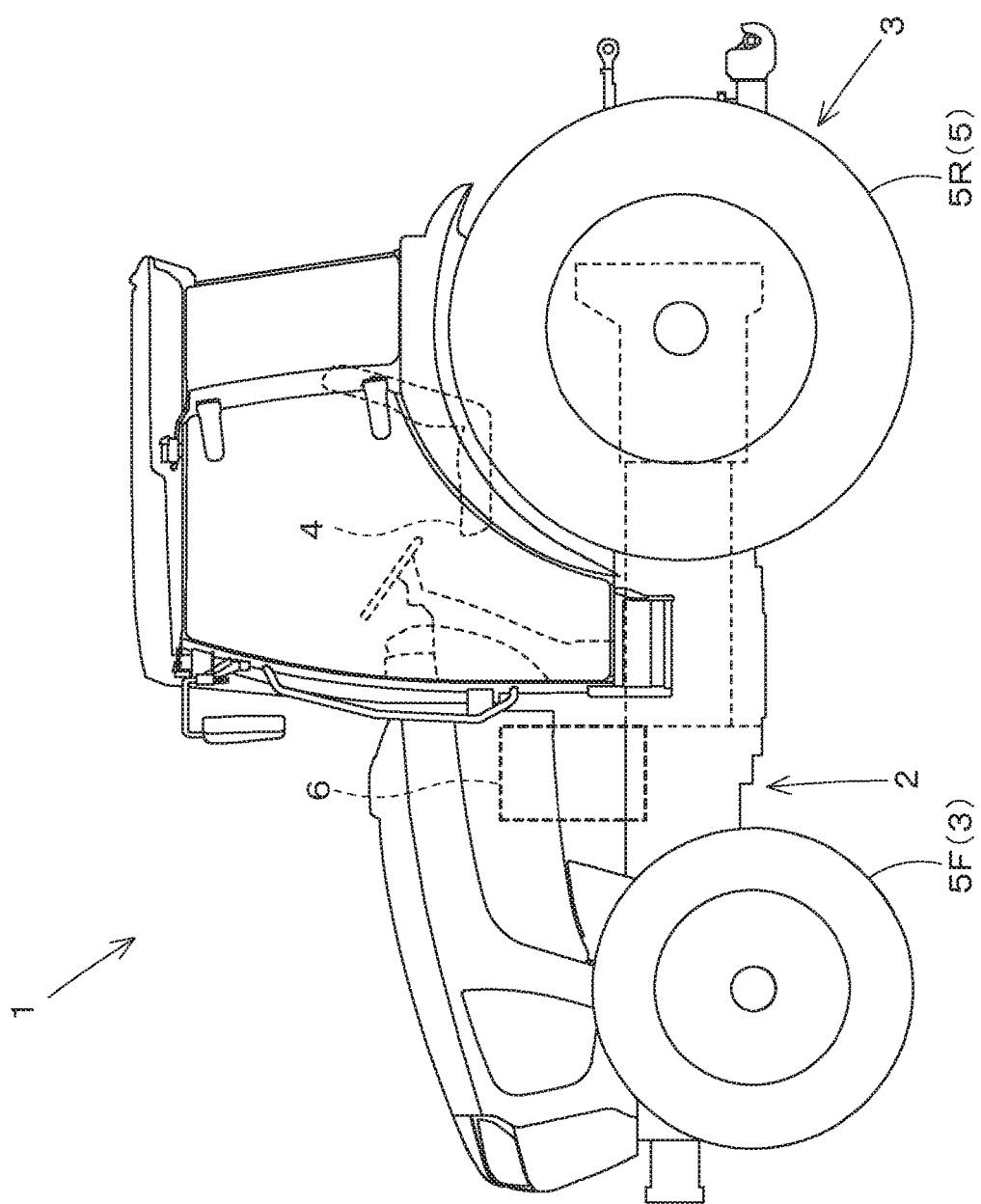
FIG. 1 is a side view of an embodiment of an electric vehicle according to the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, preferred embodiments of an electric vehicle according to the present invention will be described.

FIG. 1 is a side view of an embodiment of an electric vehicle 1 according to the present invention.

In FIG. 1, a working vehicle is illustrated as the electric vehicle 1. The working vehicle illustrated in FIG. 1 is a tractor. However, the electric vehicle 1 according to the present invention is not limited to a tractor. The electric vehicle 1 may be a working vehicle such as a backhoe, a loader working machine (a wheel loader, a compact truck loader, a skid-steer loader, or the like), a utility vehicle (a multipurpose working vehicle), a truck; or may be a vehicle other than a working vehicle.

The electric vehicle 1 includes a vehicle body 2 and a travel device 3 that supports the vehicle body 2 so that the vehicle body 2 can travel.

A seat 4, on which an operator sits, is provided in the vehicle body 2. The travel device 3 includes at least one wheel 5. The wheel 5 includes at least one front wheel 5F that is provided on a front part of the vehicle body 2 and at least one rear wheel 5R that is provided on a rear part of the vehicle body 2. The front wheel 5F and the rear wheel 5R are provided on each of the left side and the right side of the vehicle body 2.

An electric motor 6, which drives at least one wheel of the travel device 3, is mounted in the vehicle body 2. The electric vehicle 1 according to the present embodiment is a rear-wheel drive electric vehicle in which the rear wheels 5R are driven by the electric motor 6. However, the electric vehicle 1 may be a front-wheel drive electric vehicle in which the front wheels 5F are driven by the electric motor 6, or may be a four-wheel drive electric vehicle in which the front wheels 5F and the rear wheels 5R are driven by the electric motor 6.

Figure 2:
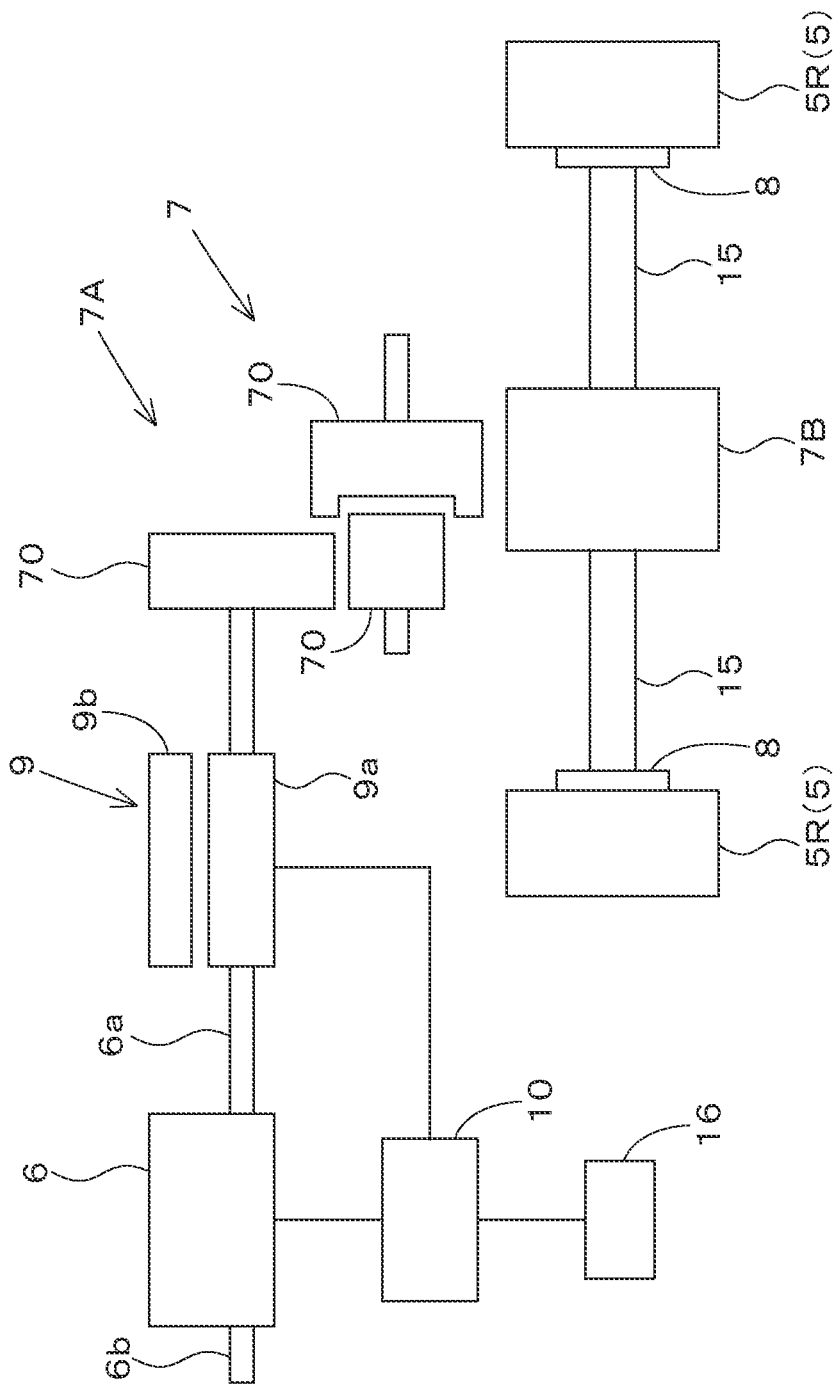
FIG. 2 is a block diagram of a drive train of the electric vehicle.

FIG. 2 is a block diagram of a drive train of the electric vehicle 1.

As illustrated in FIG. 2, the electric vehicle 1 includes, as components of the drive train, a power transmission mechanism 7, at least one wheel brake 8, an electromagnetic brake 9, and a controller 10.

The power transmission mechanism 7 is a mechanism that transmits the rotational power of the electric motor 6 to the wheels 5 (in the present embodiment, the rear wheels 5R). The power transmission mechanism 7 defines at least a part of the power transmission path between the electric motor 6 and the wheel 5. In the example illustrated in FIG. 2, the power transmission path between the electric motor 6 and the wheel 5 includes the power transmission mechanism 7 and the electromagnetic brake 9.

The power transmission mechanism 7 has a speed reducer 7A and a differential 7B. The rotational power of the electric motor 6 is input to the speed reducer 7A and transmitted to the wheels 5 via the differential 7B. The speed reducer 7A reduces the rotation speed of the electric motor 6 by using a combination of a plurality of gears 70 and transmits the rotational power to the differential 7B. The differential 7B is connected to an axle 15 of the wheels 5, and transmits the rotational power, which is transmitted from the speed reducer 7A, to the wheels 5 on the left side and the right side.

The wheel brake 8 is provided on the wheel 5. Preferably, the wheel brake 8 is provided, among the front wheels 5F and the rear wheels 5R, at least on each of the wheels that serves as a driving wheel. In the present embodiment, the wheel brake 8 is provided on each of the rear wheels 5R.

However, the wheel brake 8 may be provided on each of the front wheels 5F or may be provided on each of the front wheels 5F and the rear wheels 5R. The wheel brake 8 is a brake that stops the rotation of the wheel 5 by using a frictional braking force. The wheel brake 8 has, for example, a brake disc that rotates together with the wheel 5, and a brake pad that is pressed against the brake disc by being driven by a hydraulic cylinder or the like. The wheel brake 8 is activated when a brake pedal, which is provided in the electric vehicle 1, is depressed.

The electromagnetic brake 9 stops the rotation of the electric motor 6. The electromagnetic brake 9 is provided on a power transmission path between the electric motor 6 and the wheel 5 (at an intermediate position on a path along which power is transmitted from the electric motor 6 to the wheel 5).

In the present embodiment, the electromagnetic brake 9 is provided on a power transmission path between the electric motor 6 and the power transmission mechanism 7 (at an intermediate position on a path along which power is transmitted from the electric motor 6 to the power transmission mechanism 7). To be specific, the electromagnetic brake 9 is provided on a power transmission path between the electric motor 6 and the speed reducer 7A (at an intermediate position on a path along which power is transmitted from the electric motor 6 to the speed reducer 7A).

The electromagnetic brake 9 stops the rotation of an output shaft 6a of the electric motor 6 (a shaft that transmits the rotational power of the electric motor 6 to the power transmission mechanism 7). In the present embodiment, the electromagnetic brake 9 is attached to the output shaft 6a of the electric motor 6. However, the electromagnetic brake 9 may be attached to another shaft 6b that rotates in coordination with the output shaft 6a of the electric motor 6. In FIG. 2, a shaft that protrudes in a direction away from the output shaft 6a of the electric motor 6 is illustrated as the other shaft 6b.

The electromagnetic brake 9 has a rotary portion 9a, which is attached to the output shaft 6a (or the other shaft 6b) of the electric motor 6, and a fixed portion 9b, which faces the rotary portion 9a. The electromagnetic brake 9 can generate a braking force (a force that stops the rotation of the rotary portion 9a and the output shaft 6a) due to friction and magnetism by causing the rotary portion 9a and the fixed portion 9b to contact each other by using an electromagnetic force that is generated by energizing a coil.

The electromagnetic brake 9 is activated based on control by the controller 10. The controller 10 includes a CPU, an electric-electronic circuit, a storage unit, and the like. The storage unit includes a RAM, a ROM, and the like. A predetermined control program is stored in the storage unit. The CPU controls the operations of the electric motor 6 and the electromagnetic brake 9 based on the control program.

Figure 3:
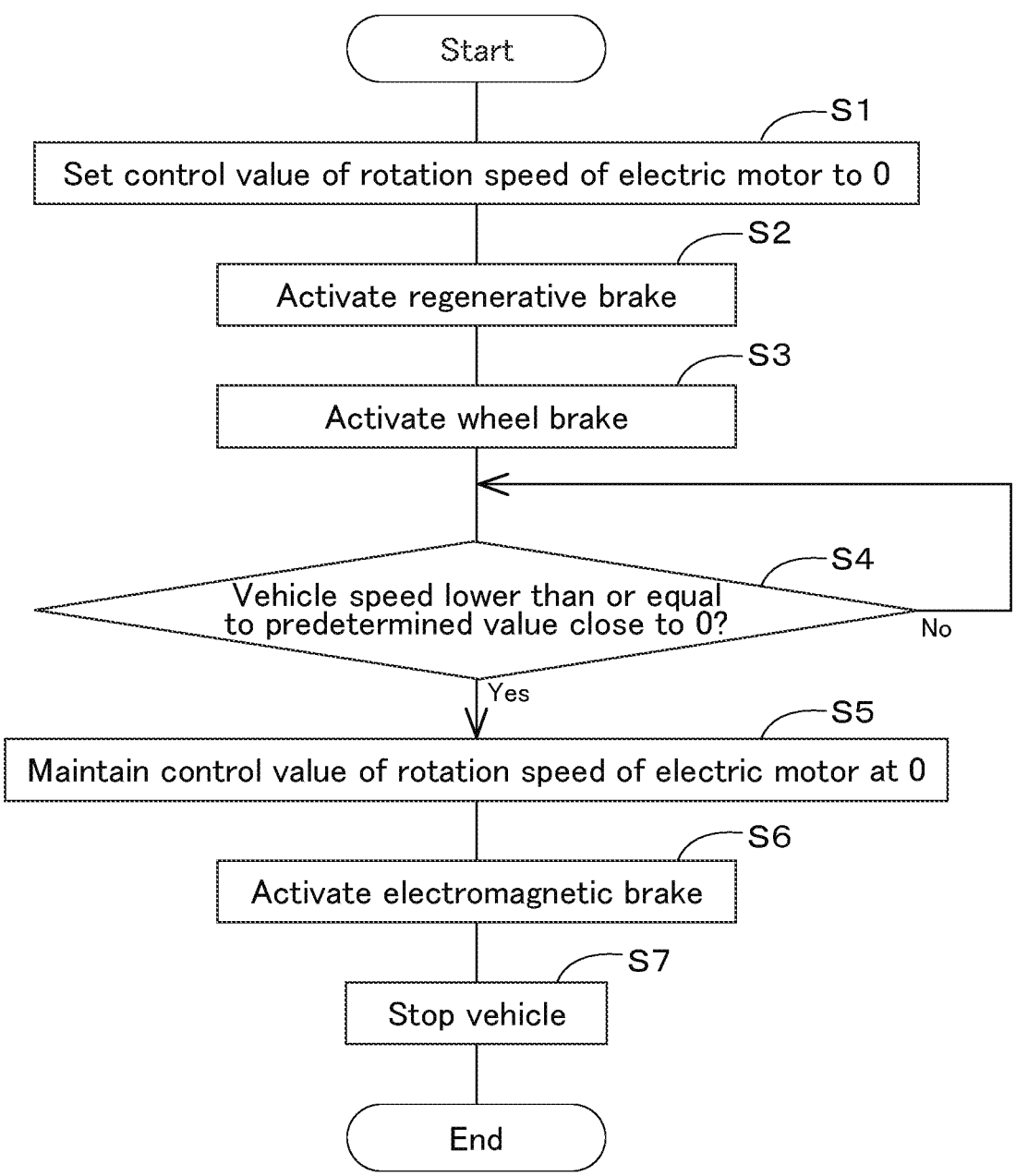
FIG. 3 is a flowchart of an example (first example) of an operational flow when the electric vehicle is stopped from a travelling state.

FIG. 3 is a flowchart of an example (first example) of an operational flow when the electric vehicle 1 is stopped from a travelling state.

When stopping the electric vehicle 1 from a travelling state, first, the controller 10 sets the control value of the rotation speed of the electric motor 6 to 0 (S1). The phrase "sets the control value of the rotation speed of the electric motor 6 to 0" means that the controller 10 controls the value of an electric current supplied to the electric motor 6 so that the rotation speed of the electric motor 6 becomes 0. If the controller 10 sets the control value of the rotation speed of the electric motor 6 to 0 when the electric vehicle 1 is moving, an electric current for setting the rotation speed to 0 (an electric current that causes the electric motor 6 to rotate in a direction opposite to the direction in which the electric motor 6 is rotating) is supplied to the electric motor 6. The electric motor 6 enters a state in which the electric motor 6 is forcibly rotated in accordance with the rotation of the wheel 5, until the rotation speed becomes 0 (until the electric vehicle 1 stops). Thus, the electric motor 6 enters a regenerative state in which the electric motor 6 functions as a generator, and a regenerative brake is activated (S2). Thus, the electric vehicle 1 starts decelerating.

The controller 10 starts the operation of setting the control value of the rotation speed of the electric motor 6 to 0 when an accelerator pedal, which is provided in the electric vehicle 1, is stopped being depressed or when the accelerator pedal is stopped being depressed and the brake pedal is depressed.

After activating the regenerative brake, the controller 10 activates the wheel brake 8 when the brake pedal is depressed (S3). Because the electric vehicle 1 decelerates when the regenerative brake is activated, the wheel brake 8 is activated in a state in which the electric vehicle 1 has decelerated due to the activation of the regenerative brake.

The electric vehicle 1 further decelerates due to activation of the wheel brake 8 in addition to the regenerative brake. When the vehicle speed of the electric vehicle 1 becomes a predetermined value close to 0 (S4: Yes), the controller 10 maintains the control value of the rotation speed of the electric motor 6 at 0 (S5), and, while maintaining the control value at 0, activates the electromagnetic brake 9 (S6). Thus, the electric vehicle 1 stops travelling (S7). When the vehicle speed of the electric vehicle 1 does not become the predetermined value close to 0 (S4: No), the controller 10 does not activate the electromagnetic brake 9 until the vehicle speed becomes the predetermined value close to 0.

The "predetermined value close to 0" is, for example, "5 km/h". However, the predetermined value is not limited to this value, may be a value (for example, "10 km/h") greater than this value, or may be a value (for example "3 km/h") less than this value.

Even after the electric vehicle 1 has stopped travelling (S7), the controller 10 can maintain the stopped state of the electric vehicle 1 by maintaining the control value of the rotation speed of the electric motor 6 at 0 and maintaining the activated state of the electromagnetic brake 9.

When an operation unit 16 (see FIG. 2) for releasing the stopped state is operated, the controller 10 releases the stopped state of the electric vehicle 1. The operation unit 16, which is operable by an operator sitting on the seat 4, is, for example, an accelerator pedal, an operation button, or the like. When a releasing operation using the operation unit 16 (depressing of the accelerator pedal, pressing of the operation button, or the like) is performed, the controller 10 stops maintaining the control value of the rotation speed of the electric motor 6 at 0, and stops activating the electromagnetic brake 9. Thus, the electric vehicle 1 is released from the stopped state and becomes capable of travelling.

As heretofore described, when the vehicle speed of the electric vehicle 1 becomes lower than or equal to the predetermined value close to 0, the controller 10 maintains the control value of the rotation speed of the electric motor 6 at 0 and activates the electromagnetic brake 9.

To be specific, the controller 10, after setting the control value of the rotation speed of the electric motor 6 to 0 and activating the regenerative brake of the electric motor 6, maintains the control value of the rotation speed of the electric motor 6 at 0 and activates the electromagnetic brake 9 when the vehicle speed of the electric vehicle 1 becomes lower than or equal to the predetermined value close to 0.

To be more specific, the controller 10 sets the control value of the rotation speed of the electric motor 6 to 0 and activates the regenerative brake of the electric motor 6, and, after the wheel brake 8 is activated, the controller 10 maintains the control value of the rotation speed of the electric motor 6 at 0 and activates the electromagnetic brake 9 when the vehicle speed of the electric vehicle 1 becomes lower than or equal a predetermined value close to 0.

As described above, with the electric vehicle 1 according to the present invention, it is possible to minimize deceleration of the electric vehicle 1 due to friction of the electromagnetic brake 9, because the controller 10 stops the electric vehicle 1 by maintaining the control value of the rotation speed of the electric motor 6 at 0 and activating the electromagnetic brake 9 when the vehicle speed becomes lower than or equal to a predetermined value close to 0. Therefore, it is possible to reduce heat generation and wear due to friction that occur when the electromagnetic brake 9 is activated.

Moreover, it is possible to maintain the stopped state of the electric vehicle 1 because the controller 10 maintains the control value of the rotation speed of the electric motor 6 at 0 and maintains the activated state of the electromagnetic brake 9 after the electric vehicle 1 has stopped travelling. Therefore, it is possible to maintain the stopped state without continuing depressing the brake pedal or manually activating the parking brake as in existing electric vehicles.

Figure 4:
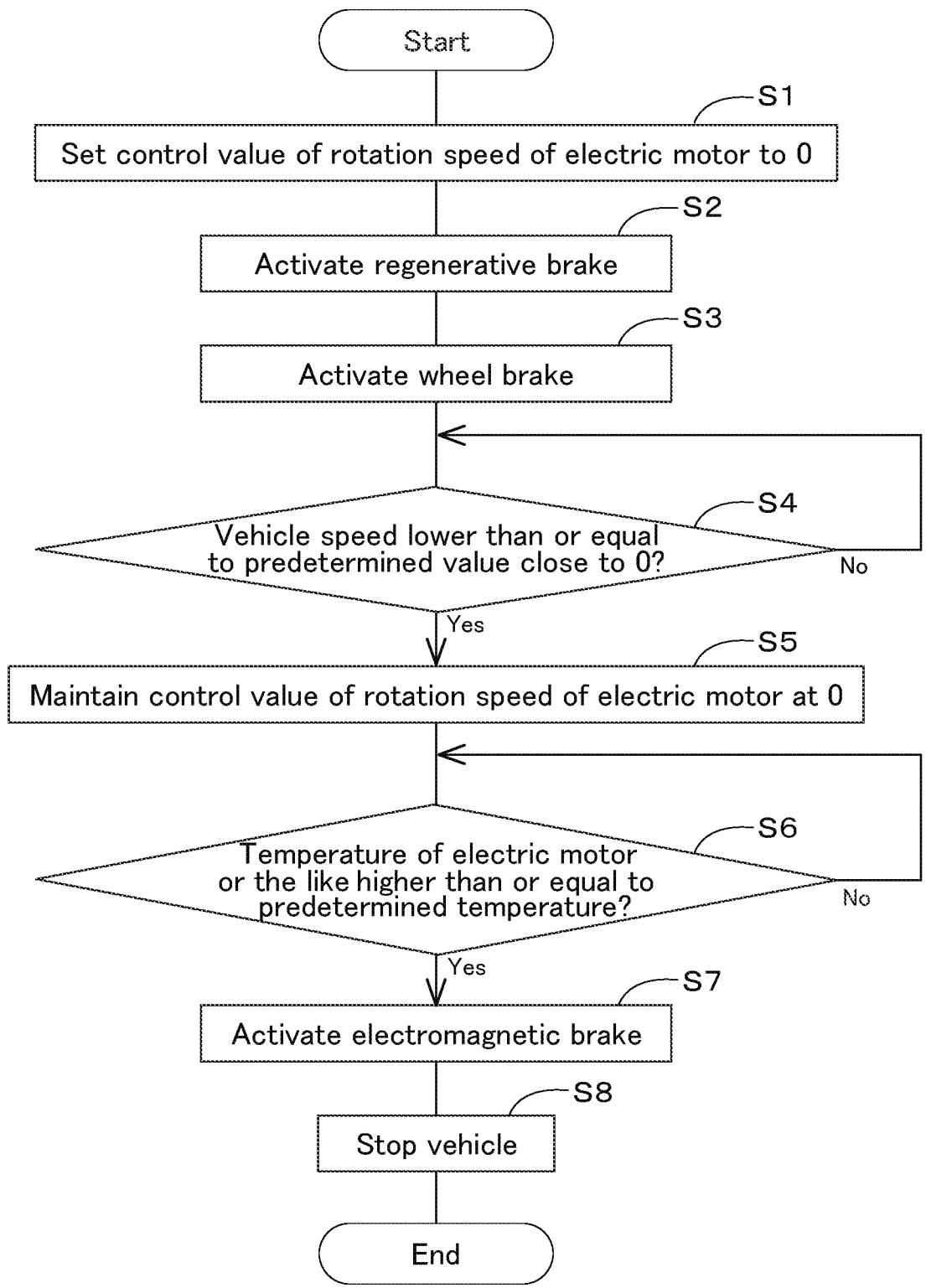
FIG. 4 is a flowchart of another example (second example) of an operational flow when the electric vehicle is stopped from a travelling state.

FIG. 4 is a flowchart of another example (second example) of an operational flow when the electric vehicle 1 is stopped from a travelling state. S1 to S5 are the same as those of the operational flow of the first example.

When stopping the electric vehicle 1 from a travelling state, first, the controller 10 sets the control value of the rotation speed of the electric motor 6 to 0 (S1). When the control value of the rotation speed of the electric motor 6 is set to 0 in the travelling state, the electric motor 6 enters a state in which the electric motor 6 is forcibly rotated in accordance with the rotation of the wheel 5. Thus, the electric motor 6 functions as a generator, and a regenerative brake is activated (S2).

After activating the regenerative brake, the controller 10 activates the wheel brake 8 when the brake pedal is depressed (S3). Because the electric vehicle 1 decelerates when the regenerative brake is activated, the wheel brake 8 is activated in a state in which the electric vehicle 1 has decelerated from the speed before activation of the regenerative brake.

The electric vehicle 1 further decelerates due to activation of the wheel brake 8 in addition to the regenerative brake. When the vehicle speed of the electric vehicle 1 becomes a predetermined value close to 0 (S4: Yes), the controller 10 maintains the control value of the rotation speed of the electric motor 6 at 0 (S5), and, while maintaining the control value at 0, activates the electromagnetic brake 9 (S7). Thus, the electric vehicle 1 stops travelling (S8). When the vehicle speed of the electric vehicle 1 does not become the predetermined value close to 0 (S4: No), the controller 10 does not activate the electromagnetic brake 9 until the vehicle speed becomes the predetermined value close to 0.

In the operational flow of the second example, the temperature of the electric motor 6 or an electric device electrically connected to the electric motor 6 is considered as a condition for activating the electromagnetic brake 9. The electric device electrically connected to the electric motor 6, which is an electric device directly or indirectly electrically connected the electric motor 6, is, for example, a battery that supplies electric power to the electric motor 6, an inverter interposed between the battery and the electric motor 6, or the like. The battery or the inverter is mounted in the electric vehicle 1. Hereafter, "the electric motor 6 or the electric device electrically connected to the electric motor 6" will be referred to as "the electric motor 6 or the like".

As illustrated in FIG. 4, the controller 10, while maintaining the control value of the rotation speed of the electric motor 6 at 0, activates the electromagnetic brake 9 when the temperature of the electric motor 6 or the like becomes higher than or equal to a predetermined temperature (S6: Yes). On the other hand, the controller 10 does not activate the electromagnetic brake 9 when the temperature of the electric motor 6 or the like is lower than the predetermined temperature (S6: No).

If the control value of the rotation speed of the electric motor 6 is maintained at 0 when the electric vehicle 1 is moving, an electric current for setting the rotation speed to 0 is continued to be supplied to the electric motor 6 while the electric motor 6 is forcibly rotated. Therefore, as time elapses while the control value of the rotation speed of the electric motor 6 is maintained at 0, the temperature of the electric motor 6 or the like increases because the electric current is continued to be supplied.

As a measure against this, by activating the electromagnetic brake 9 when the temperature of the electric motor 6 or the like becomes higher than or equal to a predetermined temperature while the control value of the rotation speed of the electric motor 6 is maintained at 0, it is possible to reduce the amount of electric current suppled to set the rotation speed of the electric motor 6 to 0 and it is possible to prevent overheating of the electric motor 6 or the like.

The aforementioned predetermined temperature may be, for example, 100° C. However, the predetermined temperature is not limited be 100° C., may be a temperature lower than 100° C. (for example, 80° C.), or may be a temperature higher than 100° C. (for example, 120° C.).

The predetermined temperature may be changed in accordance with the type of the electric motor 6 or the like whose temperature is considered as a condition for activating the electromagnetic brake 9. In a case where the electric motor 6 or the like is the electric motor 6, the predetermined temperature is set to, for example, 100° C. When the electric motor 6 or the like is a battery, the predetermined temperature is set to, for example, 60° C. When the electric motor 6 or the like is an inverter, the predetermined temperature is set to, for example, 80° C. However, the predetermined temperature is not limited to any of these temperatures.

It is possible to measure the temperature of the electric motor 6 or the like by using a temperature-measuring device, such as a temperature sensor, included in the electric vehicle 1. The controller 10 receives, from the temperature-measuring device, information regarding the temperature of the electric motor 6 or the like, and, based on the information, determines whether the temperature of the electric motor 6 or the like is higher than or equal to the predetermined temperature.

Figure 5:
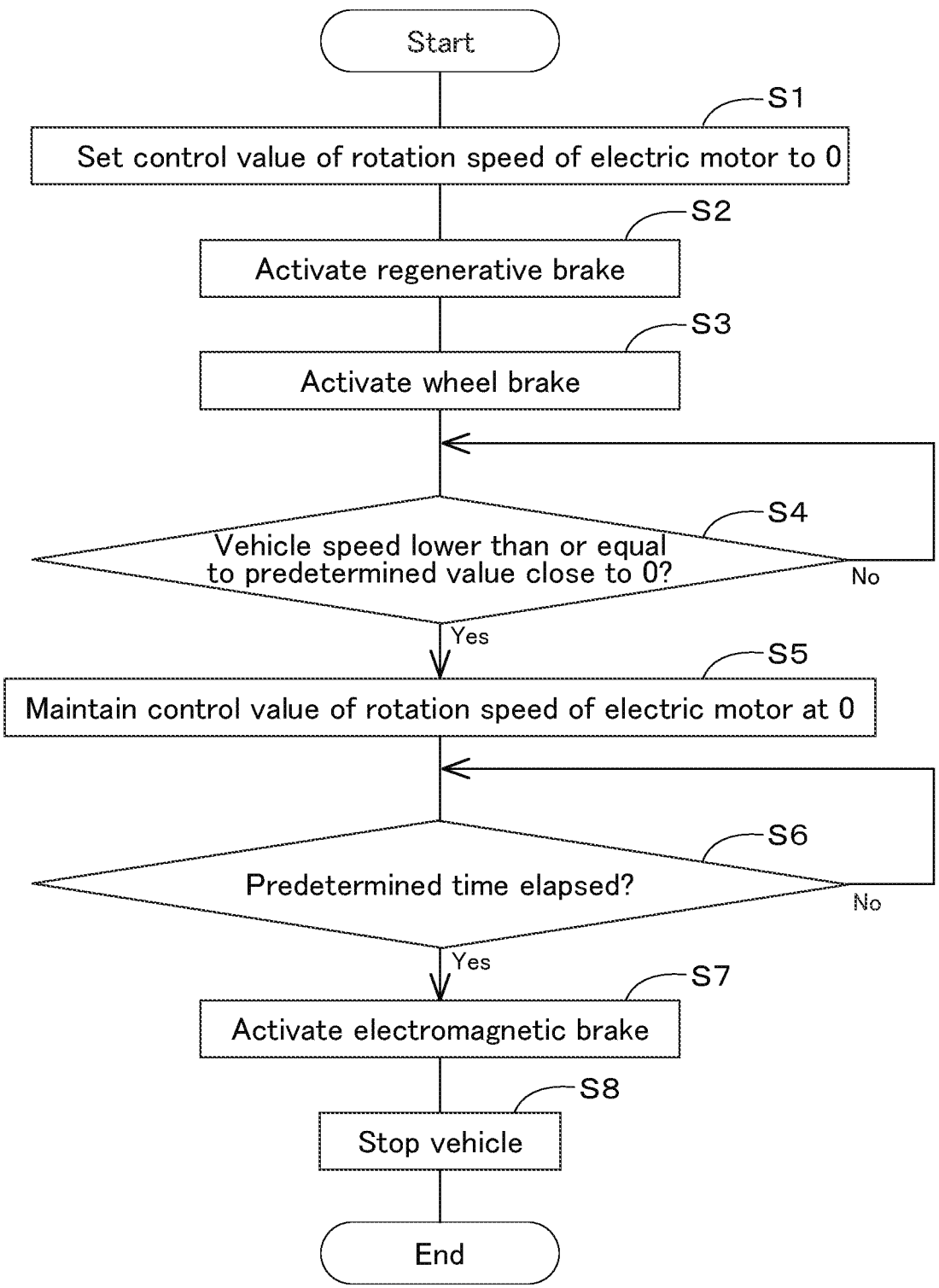
FIG. 5 is a flowchart of still another example (third example) of an operational flow when the electric vehicle is stopped from a travelling state.

FIG. 5 is a flowchart of still another example (third example) of an operational flow when the electric vehicle 1 is stopped from a travelling state. S1 to S5 are the same as those of the operational flow of the first example.

When stopping the electric vehicle 1 from a travelling state, first, the controller 10 sets the control value of the rotation speed of the electric motor 6 to 0 (S1). When the control value of the rotation speed of the electric motor 6 is set to 0 in the travelling state, the electric motor 6 enters a state in which the electric motor 6 is forcibly rotated in accordance with the rotation of the wheel 5. Thus, the electric motor 6 functions as a generator, and a regenerative brake is activated (S2).

After activating the regenerative brake, the controller 10 activates the wheel brake 8 when the brake pedal is depressed (S3). Because the electric vehicle 1 decelerates when the regenerative brake is activated, the wheel brake 8 is activated in a state in which the electric vehicle 1 has decelerated from the speed before activation of the regenerative brake.

The electric vehicle 1 further decelerates due to activation of the wheel brake 8 in addition to the regenerative brake. When the vehicle speed of the electric vehicle 1 becomes a predetermined value close to 0 (S4: Yes), the controller 10 maintains the control value of the rotation speed of the electric motor 6 at 0 (S5), and, while maintaining the control value at 0, activates the electromagnetic brake 9 (S7). Thus, the electric vehicle 1 stops travelling (S8). When the vehicle speed of the electric vehicle 1 does not become the predetermined value close to 0 (S4: No), the controller 10 does not activate the electromagnetic brake 9 until the vehicle speed becomes the predetermined value close to 0.

In the operational flow of the third example, a time for which the control value of the rotation speed of the electric motor 6 is maintained at 0 is considered as a condition for activating the electromagnetic brake 9.

To be specific, the controller 10, while maintaining the control value of the rotation speed of the electric motor 6 at 0, activates the electromagnetic brake 9 when a predetermined time elapses (S6: Yes). On the other hand, the controller 10, while maintain the control value of the rotation speed of the electric motor 6 at 0, does not activate the electromagnetic brake 9 when the predetermined does not elapse (S6: No).

As described above, as time elapses while the control value of the rotation speed of the electric motor 6 is maintained at 0, the temperature of the electric motor 6 or the like increases because the electric current is continued to be supplied.

Therefore, by activating the electromagnetic brake 9 when the predetermined time elapses while the control value of the rotation speed of the electric motor 6 or the like is maintained at 0, it is possible to reduce the amount of electric current suppled to set the rotation speed of the electric motor 6 to 0, and it is possible to prevent overheating of the electric motor 6 or the like.

The aforementioned predetermined time may be, for example, 30 seconds. However, the predetermined time is not limited be 30 seconds, may be a time shorter than 30 seconds (for example, 20 seconds), or may be a time longer than 30 seconds (for example, 60 seconds).

It is possible to measure the time, for which the rotation speed of the electric motor 6 is maintained at 0, by using a time-measuring device such as a timer included in the electric vehicle 1. The controller 10 receives, from the time-measuring device, information regarding the time for which the rotation speed of the electric motor 6 is maintained at 0, and, based on the information, determines whether the predetermined time has elapsed while the control value of the rotation speed of the electric motor 6 is maintained at 0.

In the first to third examples described above, it has been described that the wheel brake 8 is activated by depressing the brake pedal. However, the wheel brake 8 may be activated by, instead of depressing the brake pedal, operating a brake operation unit different from the brake pedal (for example, a brake button or the like provided in the electric vehicle 1). The wheel brake 8 may be activated by the controller 10.

Figure 6:
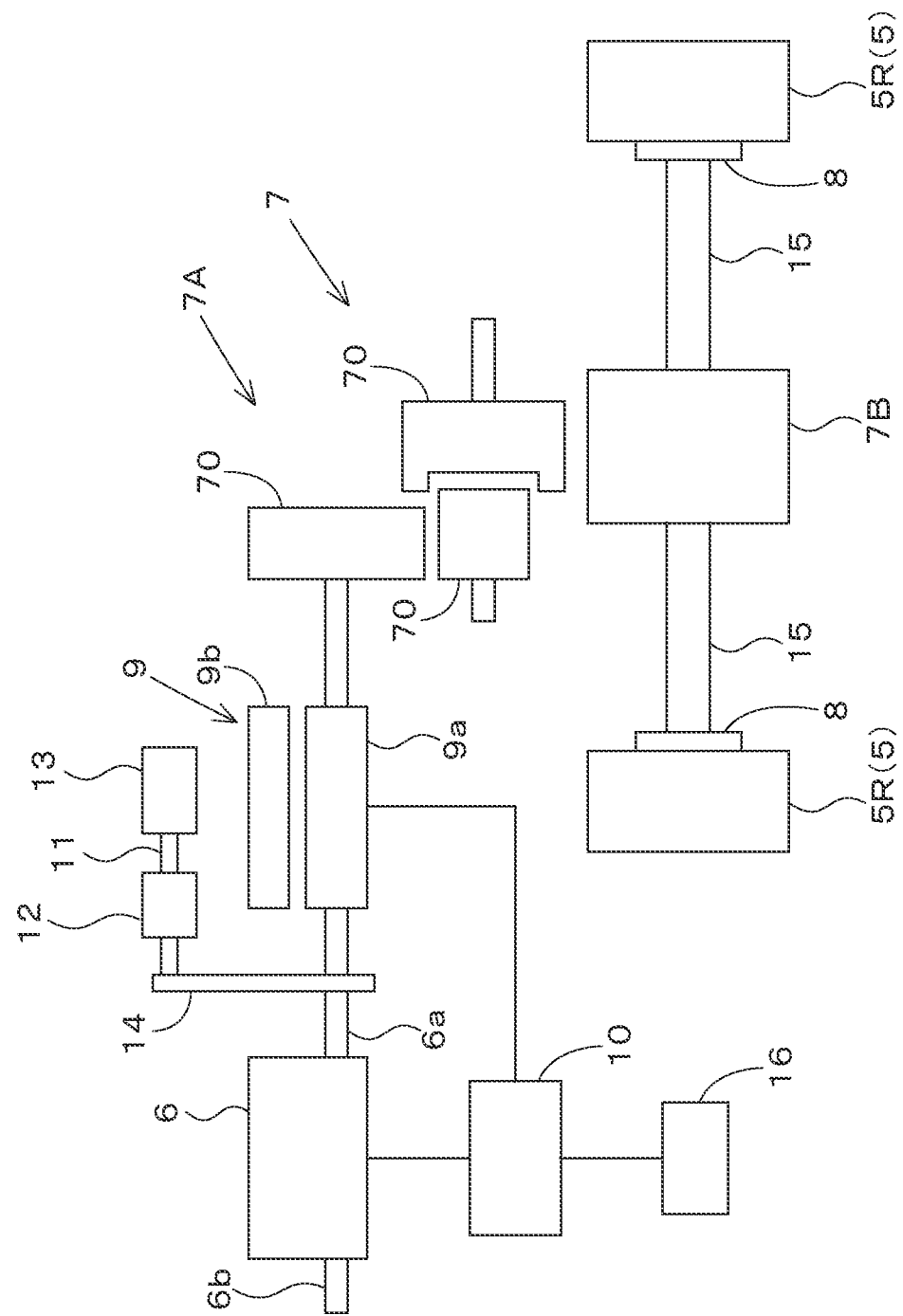
FIG. 6 is a block diagram of another example of a drive train of the electric vehicle.

FIG. 6 is a block diagram of another example of a drive train of the electric vehicle 1.

Hereafter, the difference between the configuration of the drive train illustrated in FIG. 6 and the configuration of the drive train illustrated in FIG. 2 will be described, and the description of matters common to these configurations will be omitted.

The drive train illustrated in FIG. 6 includes a transmission shaft 11 that transmits the rotational power of the electric motor 6 to a moving unit 13 other than the wheel 5. The transmission shaft 11 is, for example, a power take-off (PTO) shaft. In this case, the moving unit 13 is a working device that is driven by power transmitted from the PTO shaft. In a case where the electric vehicle 1 is a tractor, the moving unit 13 is a working device that performs work on an agricultural field. To be specific, the working device is, for example, a cultivator that cultivates the agricultural field, a broadcast spreader that spreads fertilizer and agricultural chemicals over the agricultural field, a seeder that spreads seeds over the agricultural field, or the like.

A power branching unit 14, which branches the rotational power of the output shaft 6a and transmits the rotational power to the transmission shaft 11, is provided on the output shaft 6a of the electric motor 6. The power branching unit 14 includes, for example, a gear mechanism, a belt transmission mechanism, or the like.

A clutch 12, which allows or prohibits transmission of the rotational power from the electric motor 6 to the transmission shaft 11, is provided between the output shaft 6a of the electric motor 6 and the transmission shaft 11. The clutch 12 is provided in an intermediate part of the power transmission path from the output shaft 6a to the transmission shaft 11. The clutch 12 is, for example, an electric clutch. In a case where the transmission shaft 11 is a PTO shaft, a one-way clutch is preferably used as the clutch 12.

The controller 10, when stopping movement of the moving unit 13, maintains the control value of the rotation speed of the electric motor 6 at 0 and activates the electromagnetic brake 9, and stops transmission of the rotational power from the electric motor 6 to the transmission shaft 11 by using the clutch 12. Thus, it is possible to stop both of the wheel 5 and the moving unit 13. Moreover, it is possible to stop the movement of the moving unit 13 before the wheel 5 stops by using the clutch 12. Therefore, it is possible to rapidly and reliably stop the moving unit 13.

The clutch 12 is not limited to a clutch that is activated by the controller 10. The clutch 12 may be, instead of a clutch activated by the controller 10, a clutch that can be activated by operating an operation actuator such as an operation button (by performing an operation for stopping transmission of the rotational power from the electric motor 6 to the transmission shaft 11). In this case, it is possible to stop the movement of the moving unit 13 independently from the movement of the wheel 5 by operating the operation actuator. That is, it is possible to stop the moving unit 13 by operating the operation actuator without stopping the wheel 5.

The electric vehicle 1 according to the embodiment described above has the following advantages.

The electric vehicle 1 includes: the electric motor 6; the wheel 5 that is driven by the electric motor 6; the power transmission mechanism 7 that defines at least a part of the power transmission path between the electric motor 6 and the wheel 5 and that transmits rotational power of the electric motor 6 to the wheel 5; the wheel brake 8 that is provided on the wheel 5; the electromagnetic brake 9 that stops rotation of the electric motor 6; and the controller 10 that maintains a control value of the rotation speed of the electric motor 6 at 0 and activates the electromagnetic brake 9 when the vehicle speed becomes lower than or equal to a predetermined value close to 0.

With this configuration, it is possible to stop the electric vehicle 1 and to maintain the stopped state by maintaining the control value of the rotation speed of the electric motor 6 at 0 and activating the electromagnetic brake 9 when the vehicle speed of the electric vehicle 1 becomes lower than or equal to the predetermined value close to 0. Therefore, it is possible to minimize deceleration due to friction of the brake (the electromagnetic brake 9), and to reduce heat generation and wear due to friction that occur when the brake is activated. Moreover, it is possible to maintain the stopped state without continuing depressing the brake pedal and without manually operating a parking brake as in existing electric vehicles. Furthermore, it is possible to reduce the number of electric actuators for brakes, because the electric actuator (the electromagnetic brake 9) is used not to press the brake disc but to stop rotation of the electric motor 6.

The controller 10, after setting the control value of the rotational speed of the electric motor 6 to 0 and activating the regenerative brake of the electric motor 6, maintains the control value at 0 and activates the electromagnetic brake 9 when the vehicle speed becomes lower than or equal to the predetermined value close to 0.

With this configuration, irrespective of whether the wheel brake 8 is activated, it is possible to activate the electromagnetic brake 9 after reducing the vehicle speed of the electric vehicle 1 to the predetermined value close to 0 by using the regenerative brake of the electric motor 6.

The controller 10, after activating the wheel brake 8 and the regenerative brake, maintains the control value of the rotational speed of the electric motor 6 at 0 and activates the electromagnetic brake 9 when the vehicle speed becomes lower than or equal to the predetermined value close to 0.

With this configuration, it is possible to activate the electromagnetic brake 9 after rapidly reducing the vehicle speed of the electric vehicle 1 to the predetermined value close to 0 by activating the wheel brake 8 and the regenerative brake.

The controller 10, while maintaining the control value of the rotational speed of the electric motor 6 at 0, activates the electromagnetic brake 9 when the temperature of the electric motor 6 becomes higher than or equal to a predetermined temperature.

With this configuration, it is possible to prevent overheating of the electric motor 6 by continuing maintaining the control value of the rotation speed of the electric motor 6 at 0 (continuing causing an electric current for setting the rotation speed to 0 to flow) while the electric motor 6 is rotating.

The controller 10, while maintaining the control value of the rotational speed of the electric motor 6 at 0, activates the electromagnetic brake 9 when the temperature of an electric device electrically connected to the electric motor 6 becomes higher than or equal to a predetermined temperature.

With this configuration, it is possible to prevent overheating of the electric motor 6, which may occur if the control value of the rotation speed of the electric motor 6 is continued to be maintained at 0 (an electric current for setting the rotation speed to 0 is continued to be caused to flow) while the electric motor 6 is rotating.

The controller 10, while maintaining the control value of the rotational speed of the electric motor 6 at 0, activates the electromagnetic brake 9 when a predetermined time elapses.

With this configuration, it is possible to prevent overheating of the electric motor 6 by reducing the time for which the control value of the rotation speed of the electric motor 6 is continued to be maintained at 0 (an electric current for setting the rotation speed to 0 is continued to be caused to flow) while the electric motor 6 is rotating.

The electromagnetic brake 9 is provided on the power transmission path between the electric motor 6 and the wheel 5.

With this configuration, it is possible to stop the rotation of the electric motor 6 by using the electromagnetic brake 9 at an intermediate position on the path along which power is transmitted from the electric motor 6 to the wheel 5.

The electromagnetic brake 9 is provided on the power transmission path between the electric motor 6 and the power transmission mechanism 7.

With this configuration, it is possible to stop the rotation of the electric motor 6 by using the electromagnetic brake 9 at an intermediate position on the path along which power is transmitted from the electric motor 6 to the power transmission mechanism 7. Therefore, it is possible to provide the electromagnetic brake 9 at a position separated from the wheel 5.

The electric vehicle 1 includes the transmission shaft 11 that transmits the rotational power of the electric motor 6 to the moving unit 13 other than the wheel 5; the clutch 12 that allows or prohibits transmission of the rotational power of the electric motor 6 is provided between an output shaft of the electric motor 6 and the transmission shaft 11; and the controller 10, when stopping movement of the moving unit 13, maintains the control value of the rotational speed of the electric motor 6 at 0 and activates the electromagnetic brake 9 and causes the clutch 12 to prohibit transmission of the rotational power.

With this configuration, it is possible to stop both of the wheel 5 and the moving unit 13 by using the controller 10. Moreover, it is possible to stop the movement of the moving unit 13 before the wheel 5 stops by using the clutch 12. Therefore, it is possible to rapidly and reliably stop the moving unit 13.

The electric vehicle 1 includes the operation unit 16 that is operated by an operator, and the controller 10 stops activation of the electromagnetic brake 9 when the operation unit 16 is operated.

With this configuration, it is possible for the operator to release the stopped state of the electric vehicle 1 and to allow the electric vehicle 1 to travel by operating the operation unit 16.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric vehicle comprising:
an electric motor;
a wheel that is driven by the electric motor;
a power transmission mechanism that defines at least a part of a power transmission path between the electric motor and the wheel and that transmits rotational power of the electric motor to the wheel;
a wheel brake that is provided on the wheel;
an electromagnetic brake that stops rotation of the electric motor; and
a controller that maintains a control value of a rotation speed of the electric motor at 0 and activates the electromagnetic brake when a vehicle speed becomes lower than or equal to a predetermined value close to 0, wherein
the predetermined value is 3 to 10 km/h, and
the controller, after setting the control value to 0 and activating the wheel brake and a regenerative brake of the electric motor, maintains the control value at 0 and activates the electromagnetic brake when the vehicle speed becomes lower than or equal to the predetermined value.

2. The electric vehicle according to claim 1, wherein the controller, while maintaining the control value at 0, activates the electromagnetic brake when a temperature of the electric motor becomes higher than or equal to a predetermined temperature.

3. The electric vehicle according to claim 1, wherein the controller, while maintaining the control value at 0, activates the electromagnetic brake when a temperature of an electric device electrically connected to the electric motor becomes higher than or equal to a predetermined temperature.

4. The electric vehicle according to claim 1, wherein the controller, while maintaining the control value at 0, activates the electromagnetic brake when a predetermined time elapses.

5. The electric vehicle according to claim 1, wherein the electromagnetic brake is provided on the power transmission path between the electric motor and the wheel.

6. The electric vehicle according to claim 5, wherein the electromagnetic brake is provided on a power transmission path between the electric motor and the power transmission mechanism.

7. The electric vehicle according to claim 1, comprising:
a transmission shaft that transmits the rotational power of the electric motor to a moving unit other than the wheel,
wherein a clutch that allows or prohibits transmission of the rotational power is provided between an output shaft of the electric motor and the transmission shaft, and
wherein the controller, when stopping movement of the moving unit, maintains the control value at 0 and activates the electromagnetic brake and causes the clutch to prohibit transmission of the rotational power.

8. The electric vehicle according to claim 1, comprising:
an operation unit that is operated by an operator,
wherein the controller stops activation of the electromagnetic brake when the operation unit is operated.

9. An electric vehicle comprising:
an electric motor;
a wheel that is driven by the electric motor;
a power transmission mechanism that defines at least a part of a power transmission path between the electric motor and the wheel and that transmits rotational power of the electric motor to the wheel;
a wheel brake that is provided on the wheel;
an electromagnetic brake that stops rotation of the electric motor; and
a controller that maintains a control value of a rotation speed of the electric motor at 0 and activates the electromagnetic brake when a vehicle speed becomes lower than or equal to a predetermined value close to 0, wherein the predetermined value is 3 to 10 km/h, and the controller, while maintaining the control value at 0, activates the electromagnetic brake when a temperature of the electric motor or a temperature of an electric device electrically connected to the electric motor becomes higher than or equal to a predetermined temperature.

10. An electric vehicle comprising:

an electric motor;

a wheel that is driven by the electric motor;

a power transmission mechanism that defines at least a part of a power transmission path between the electric motor and the wheel and that transmits rotational power of the electric motor to the wheel;

a wheel brake that is provided on the wheel;

an electromagnetic brake that stops rotation of the electric motor; and a controller that maintains a control value of a rotation speed of the electric motor at 0 and activates the electromagnetic brake when a vehicle speed becomes lower than or equal to a predetermined value close to 0, wherein the predetermined value is 3 to 10 km/h, and if the controller sets the control value of the rotation speed of the electric motor to 0 when the electric vehicle is moving, an electric current that causes the electric motor to rotate in a direction opposite to a direction in which the electric motor is rotating is supplied to the electric motor.

* * * * *